United States Patent
Schler (10) Patent No.: US 10,740,784 B2
(45) Date of Patent: Aug. 11, 2020

(54) SYSTEM AND METHOD FOR IMPROVING IMAGE-BASED ADVERTISEMENT SUCCESS

(71) Applicant: Amazon Technologies, Inc., Seattle, WA (US)

(72) Inventor: Jonathan Schler, Petach Tikwa (IL)

(73) Assignee: Amazon Technologies, Inc., Seattle, WA (US)

( * ) Notice: Subject to any disclaimer, the term of this patent is extended or adjusted under 35 U.S.C. 154(b) by 772 days.

(21) Appl. No.: 15/044,348

(22) Filed: Feb. 16, 2016

(65) Prior Publication Data
US 2017/0046733 A1   Feb. 16, 2017

Related U.S. Application Data

(60) Provisional application No. 62/203,676, filed on Aug. 11, 2015.

(51) Int. Cl.
*G06Q 30/02* (2012.01)
(52) U.S. Cl.
CPC ................. *G06Q 30/0244* (2013.01)
(58) Field of Classification Search
CPC ...................... G06Q 30/0207–0277
USPC ............................. 705/14.1–14.73
See application file for complete search history.

(56) References Cited

U.S. PATENT DOCUMENTS

| | | | | |
|---|---|---|---|---|
| 2014/0067735 A1* | 3/2014 | Yu | ............................. | G06N 3/02 706/20 |
| 2014/0164146 A1* | 6/2014 | Goswami | ........... | G06Q 30/0276 705/14.72 |
| 2014/0289017 A1* | 9/2014 | Trenkle | ................ | G06Q 10/067 705/7.33 |
| 2015/0371149 A1* | 12/2015 | Iso | ........................ | G06N 3/0454 706/12 |
| 2016/0283975 A1* | 9/2016 | Kaul | ...................... | G06Q 50/01 |
| 2016/0342859 A1* | 11/2016 | Rajaram | .............. | G06K 9/6202 |

OTHER PUBLICATIONS https://ieeexplore.ieee.org/document/6817512 (Year: 2014).*
Bnonn, "The Shocking Truth About How Web Graphics Affect Conversions," available on Feb. 24, 2012, retrieved from https://neilpatel.com/blog/shocking-truth-about-graphics/. (Year: 2012).*

* cited by examiner

*Primary Examiner* — Sam Refai
(74) *Attorney, Agent, or Firm* — Eversheds Sutherland (US) LLP (57) ABSTRACT

A system and method for generating recommendations for improving online advertising success of an image-based advertisement are provided. The method includes identifying at least one visual characteristic of the advertisement; classifying the advertisement into at least one advertisement category based on the identified at least one visual characteristic; analyzing a plurality of advertisements belonging to the at least one advertising category to identify at least one visual characteristic associated with successful advertisements; generating at least one recommendation for improving the image-based advertisement based on the identified at least one successful advertisement visual characteristic.

16 Claims, 4 Drawing Sheets

FIG. 4

SYSTEM AND METHOD FOR IMPROVING IMAGE-BASED ADVERTISEMENT SUCCESS

CROSS-REFERENCE TO RELATED APPLICATIONS

This application claims the benefit of U.S. Provisional Application No. 62/203,676 filed on Aug. 11, 2015, the contents of which are hereby incorporated by reference.

TECHNICAL FIELD

The present disclosure relates generally to deep-learning techniques, and more specifically to predicting advertising success using deep-learning techniques.

BACKGROUND

In recent years, the online advertising market has grown substantially to become one of the largest advertising markets in the world. As the value of online advertising increases, so does the importance of ensuring that appropriate advertisements are delivered to users in order to maximize success of advertisement campaigns. Under the increasingly common cost-per-click (CPC) model of payment, the number of times an advertisement was clicked determines the compensation provided to the website hosting the advertisement.

Due to the direct monetary value of high click rates, ensuring success of online advertisements has become essential to the online advertising market. A prevalent measure of advertisement campaign success is the click-through-rate (CTR). The CTR of an advertisement is equal to the ratio between the number of times an advertisement was clicked and the number of times the advertisement was presented to users. CTRs are typically used in conjunction with web banners (also referred to as online banner advertisements), in which such banners are embedded into webpages as static images. Such web banners are intended to attract traffic to advertisers' websites.

Online ad-serving relates to the placement of advertisements on webpages and/or within multimedia content. In addition to placing advertisements, advertisement serving systems also select which advertisements should be served to websites based on advertising campaign preferences, count impressions, click counts on advertisements, and monitored progress of different advertising campaigns. An advertisement serving system is typically realized as a server backed by a database server that stores advertisements.

In some existing solutions, the selection of which advertisements to serve on which webpages may be determined through an auction process. In such a process, advertisers bid for allocation and serving of their online advertisements in connection with serving opportunities. In online advertising, an auction process is typically realized by means of a real-time bidding (RTB) system. In some configurations, the advertisements may be served based on ad-exchange networks' predefined settings, and so on.

Existing solutions for predicting online advertising campaign success typically focus on keywords associated with advertisements to determine whether users of a particular website are likely to be interested in the advertisements. However, such solutions lack the ability to identify characteristics in advertisements that are not represented by keywords. Additionally, such solutions do not provide information on how to improve proposed advertisements before delivery.

Other solutions for predicting online advertising campaign success are based on demographics of a target audience. However, the creative aspects (i.e., the design) of the advertisements are usually not considered when determining potential success based on demographics.

As a result, a designer of an advertisement cannot design the creative aspects of the advertisement in such a way that would maximize advertisement campaign success. Specifically, this is the case for web banners and other image-based advertisements. For example, a designer cannot make an educated decision regarding whether to use a blue background or a red background so as to increase the reach and the success of the advertisement.

It would therefore be advantageous to provide a solution that would overcome the deficiencies of the prior art by predicting advertisement campaign success of at least image-based advertisements.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for generating recommendations for improving online advertising success of an image-based advertisement. The method includes: identifying at least one visual characteristic of the advertisement; classifying the advertisement into at least one advertisement category based on the identified at least one visual characteristic; analyzing a plurality of advertisements belonging to the at least one advertising category to identify at least one visual characteristic associated with successful advertisements; generating at least one recommendation for improving the image-based advertisement based on the identified at least one successful advertisement visual characteristic.

The disclosed embodiments also include a system for generating recommendations for improving online advertising success of an image-based advertisement. The system includes: a processing unit; and a memory, the memory containing instructions that, when executed by the processing unit, configure the system to: identify at least one visual characteristic of the advertisement; classify the advertisement into at least one advertisement category based on the identified at least one visual characteristic; analyze a plurality of advertisements belonging to the at least one advertising category to identify at least one visual characteristic associated with successful advertisements; generate at least one recommendation for improving the image-based advertisement based on the identified successful advertisement visual characteristics.

BRIEF DESCRIPTION OF THE DRAWINGS

The subject matter disclosed herein is particularly pointed out and distinctly claimed in the claims at the conclusion of the specification. The foregoing and other objects, features.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the disclosed embodiments provide a system and method for analyzing visual characteristics of online advertisements, such as web banners. In an embodiment, the analysis is performed on successful advertisements to identify visual characteristics of such successful advertisements and to improve the design or provide guidelines of new advertisements.

In a non-limiting embodiment, the analysis for determining visual characteristics of successful advertisements is performed through deep learning techniques. Deep learning is an area of machine learning in which high-level abstractions in data are modeled using model architectures composed of multiple non-linear transformations. The various embodiments disclosed herein will be now discussed in more detail.

Figure 1:
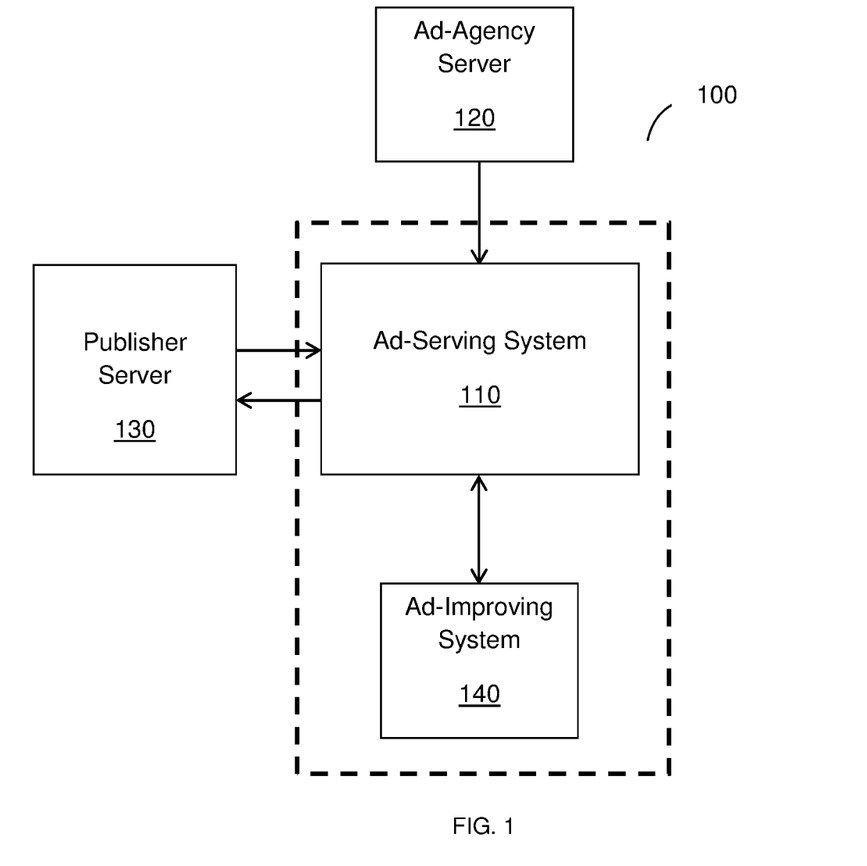
FIG. 1 is a network diagram utilized to describe the various disclosed embodiments.

FIG. 1 shows an exemplary and non-limiting network diagram 100 utilized to describe the various embodiments. The network diagram 100 includes an ad-serving system 110 communicatively connected to an ad agency server 120, a publisher server 130, and an ad-improving system 140. The connections between the various elements can be realized through a network (not shown). The network may be, but is not limited to, a wireless, cellular or wired network, a local area network (LAN), a wide area network (WAN), a metro area network (MAN), the Internet, the worldwide web (WWW), similar networks, and any combination thereof.

Typically, the ad-serving system 110 is configured to receive an impression from the publisher server 130 and to display an advertisement on a web page (not shown) hosted by the publisher server 130. The ad-serving system 110 retrieves the advertisement from the ad-agency server 120. The received advertisement is placed by the ad-serving system 110.

In an embodiment, the ad-improving system 140 is configured to receive or collect information related to the performance of the served advertisement. The performance information may include, but is not limited to, click-through-rates (CTRs), impression counts, number of clicks, combinations thereof, and so on. The performance information can be received from the ad-serving system 110, the ad-agency server 120, and/or other external systems (not shown) utilized to monitor the performance of advertisements. It should be noted that the performance information is collected per advertisement and/or per campaign served on the publisher server 130 and/or other platforms. Thus, the performance information may be related to the success of the advertisements across platforms.

In an embodiment, the ad-improving system 140 is configured to determine if the advertisement will be successful. The determination is based on one or more success thresholds set for each for performance measurement. The one or more success thresholds may be preconfigured. In a further embodiment, a successful advertisement meets at least one of the success thresholds. In another embodiment, a successful advertisement meets each of the success thresholds.

Figure 2:
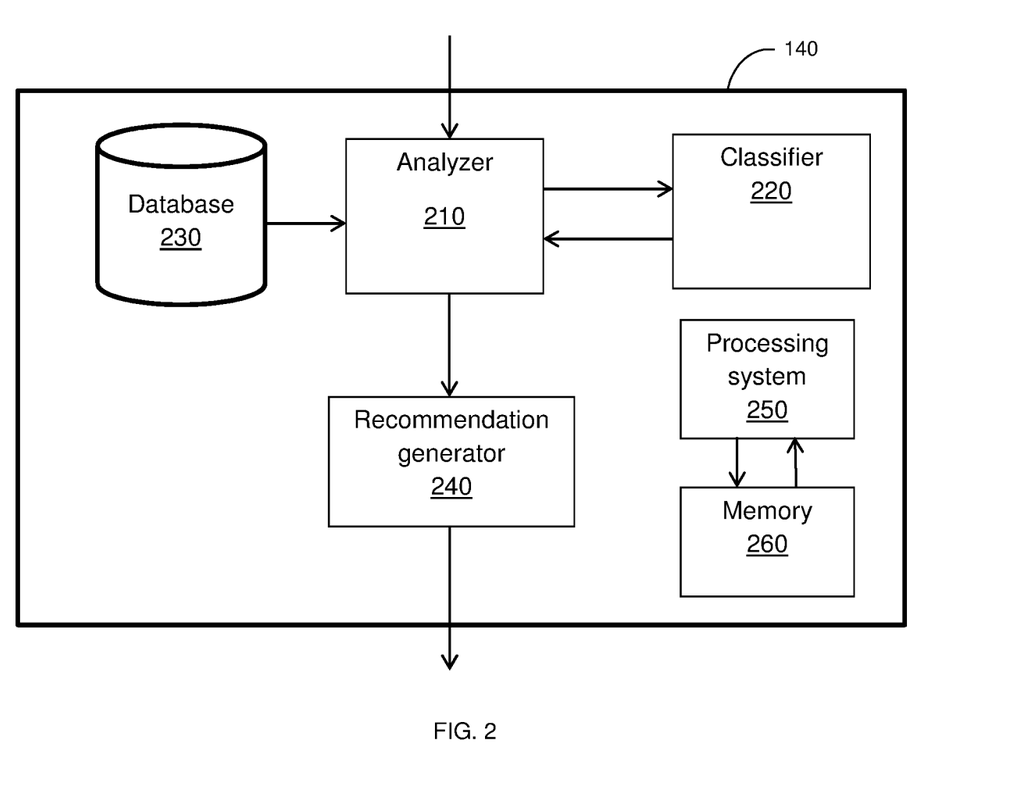
FIG. 2 is a block diagram illustrating a system for improving image-based advertisement campaign success according to an embodiment.

In an embodiment, any advertisement determined to be successful is stored in a database (e.g., the database 230, FIG. 2). The database may be included in or communicatively connected to the ad-improving system 140.

It should be noted that the ad-serving process has been described with reference to placement of one advertisement in one publisher server 130 merely for the sake of simplicity of the description and without limitation on any of the disclosed embodiments. In reality, an ample number (e.g., millions) of advertisements are served on many publisher servers or other platforms (thousands). Therefore, the database would contain a large dataset of advertisements determined to be successful.

In an embodiment, the ad-improving system 140 is configured to analyze the successful advertisements to at least detect visual characteristics of such successful advertisements. The analysis is performed using a deep learning process as described in detail herein above. In an embodiment, advertisements related to the same category may be grouped and analyzed using the deep learning process.

Based on the analysis, the ad-improving system 140 may be configured to generate recommendations for visual characteristics to be included in advertisements served by the ad-serving system 110 to improve the likelihood of its success. In an embodiment, recommended visual characteristics are provided per advertisement category (e.g., cars, clothing, etc.). For example, recommended visual characteristics may include a background color, a logo size, whether certain objects should be in the background or in the foreground of the image, font size, font type, a number of objects to be displayed, and so on. Improving advertisements via the ad-improving system 140 is described further herein below with respect to FIG. 2.

In an embodiment, the recommended visual characteristics are provided to the ad-agency (via the ad-agency sever 120) to incorporate such recommended characteristics in future advertisements.

In another embodiment, the ad-improving system 140 is configured to check the design of advertisements based on the recommended visual characteristics prior to releasing an ad-campaign by the ad-agency sever 120. In a further embodiment, the results of the check may be sent to a designer. This check allows the designer to make an educated decision regarding which advertisement design should be used among alternatives.

In yet another embodiment, it may be verified whether an advertisement complies with the recommended characteristics in real-time. In this embodiment, prior to serving the advertisement via the ad-serving system 110, the advertisement is sent to the ad-improving system 140. If the advertisement meets the recommended visual characteristics, the advertisement will be served. Otherwise, the ad-improving system 140 may generate a notification and/or cause the ad-serving system 110 to request an advertisement having a different design from the ad-agency server 120.

FIG. 2 is an exemplary and non-limiting ad-improving system 140 for improving image-based advertisement success according to an embodiment. The system 140 includes an analyzer 210, a classifier 220, a database 230, and a recommendation generator 240. In certain implementations, the ad-improving system 140 includes a processing system 250 coupled to a memory 260. The memory 260 contains instructions that, when executed by the processing system 250, configured the processing system 250 to control the various elements for advertisement analysis and recommendation generation as described herein.

The database 230 is configured to at least store advertisements determined to be successful. In an embodiment, any such successful advertisement may be stored with additional metadata including, for example, creation date, campaign, ad-agency information, category relations, and the like.

The analyzer 210 implements machine learning processes and is configured to obtain successful advertisements saved in the database 230 and to analyze the proposed advertisements to identify visual characteristics thereof. In one embodiment, the analysis is performed using a machine learning process and/or a deep learning process. To this end, the analyzer 210 is configured to process a plurality of images in order to recognize various visual characteristics within the images. Visual characteristics of an advertisement may include, but are not limited to, objects, colors, backgrounds, and so on. Objects included in advertisements may include, but are not limited to, text, logos, people, items, animals, and so on. In an embodiment, the analyzer 210 may utilize a machine learning algorithm upon receiving an advertisement in order to recognize one or more visual characteristics in the advertisement. In various embodiments, the m analyzer 210 may be pre-trained to identify a predetermined group of visual characteristics.

In an embodiment, upon identifying visual characteristics of the advertisement, the analyzer 210 sends the identified visual characteristics to the classifier 220. The classifier 220 is configured to classify the advertisement into at least one advertisement category based on the identified visual characteristics. In a non-limiting embodiment, advertisement categories are groupings of advertisements for similar products. Classification of advertisements is described further herein below with respect to FIG. 3. The classifier 220 is further configured to return at least one advertisement category of the received advertisement to the analyzer 210.

Based on the at least one advertisement category, the analyzer 210 is configured to utilize a machine learning process to identify visual characteristics that are present in successful advertisements. To this end, the analyzer 210 analyzes a plurality of image-based advertisements in order to identify visual characteristics present in each image-based advertisement. Based on such identifications, the analyzer 210 can estimate the existence of such visual characteristics in other advertisements. The analyzer 210 may further analyze successful advertisements only, thereby recognizing which visual characteristics are frequently or otherwise prominently featured in such successful advertisements. Based on this recognition, the analyzer 210 may estimate which visual characteristics should be inserted into advertisements to improve the advertisements' likelihood of success.

In an embodiment, the analyzer 210 may access an external database (not shown) in order to identify visual characteristics unique to the analyzed successful advertisements. Such visual characteristics of successful advertisements may be identified based on, e.g., prominence or frequency of the visual characteristics within successful advertisements. Identification of visual characteristics of successful advertisements is described further herein below with respect to FIG. 3. The analyzer 210 is also configured to send the identified visual characteristics of successful advertisements to the recommendation generator 240.

Upon receiving the identified visual characteristics of successful advertisements, the recommendation generator 240 is configured to generate recommendations for improving the received advertisement respective thereof. The recommendations may include, but are not limited to, an addition or change of a visual characteristic (e.g., a background change, a brightness change, an addition of an object, and so on), an overlay of a visual characteristic, a replacement with a visual characteristic, a size of a visual characteristic to be inserted, and so on. The recommendations may be generated based on, e.g., the size of the advertisement in which the visual characteristic will be inserted, sizes of other visual characteristics existing in the advertisement, and so on.

Each, some, or all of the various elements of the ad-improving system 140 (including the processing system 250) may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
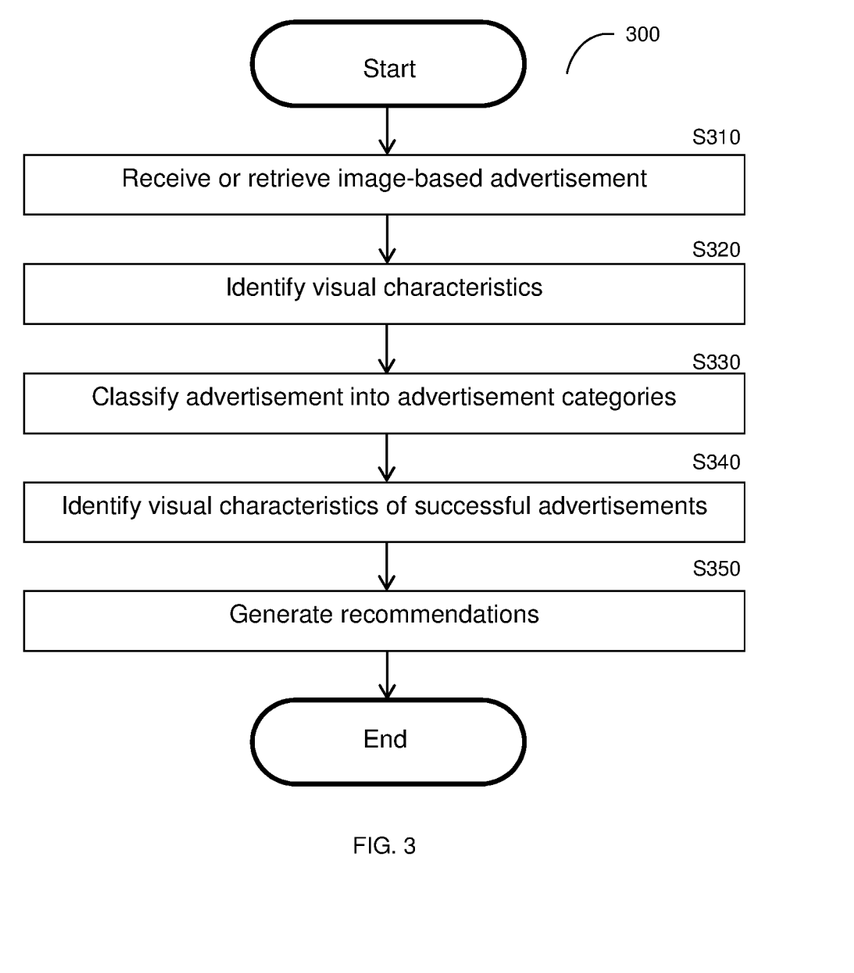
FIG. 3 is a flowchart illustrating a method for generating recommendations for improving image-based advertisement success according to an embodiment.

FIG. 3 is an exemplary and non-limiting flowchart 300 illustrating a method for improving the success of an ad campaign according to an embodiment. In an embodiment, the method may be performed by an ad-improving system (e.g., the ad-improving system 140).

In S310, an image-based advertisement is received or retrieved from a database. An image-based advertisement is an advertisement featuring one or more objects that may include, but is not limited to, a logo, text, people, products, animals, and so on. Image-based advertisements may feature still images, videos, animations, or combinations thereof.

In S320, visual characteristics of the image-based advertisement are identified. In an embodiment, S320 is performed using a machine learning network such as, e.g., a deep learning neural network. In an embodiment, the machine learning network may be implemented by the analyzer 210. Visual characteristics of an advertisement may include, but are not limited to, objects, colors, backgrounds, and so on. Objects included in advertisements may include, but are not limited to, text, logos, people, items, animals, and so on. In an embodiment, the deep learning neural network may be pre-trained to identify one or more objects.

In S330, the advertisement is classified into one or more advertisement categories. The classification may be based on the identified visual characteristics. In an embodiment, the advertisement may be classified by a classifier (e.g., the classifier 220). Advertisement categories are groupings of advertisements for similar products. Exemplary advertisement categories include, but are not limited to, electronics, auto, consumer package goods, health and beauty, telecom, retail, restaurants, services, medical, corporate, utilities, tech, and so on. An advertisement may be classified into more than one category.

In an embodiment, an advertisement may be classified into one or more advertisement categories based on the existence of objects appearing in the advertisement. In a further embodiment, the classification may be based on the prominence of each object with respect to other objects and with respect to the advertisement itself. The prominence of an object may be based on, e.g., the size of the object relative to the advertisement, whether the object is in the foreground or background of the advertisement, combinations thereof, and so on. If the prominence is determined based on the size of the object, the object may be prominent if its size is above a predetermined size prominence threshold. As a non-limiting example, an advertisement featuring a car in the foreground, where the size of the car is equal to half of the size of the entire advertisement, may be classified as an "auto" advertisement. As another non-limiting example, an advertisement that shows an image of a remote control in the foreground, where the size of the remote control is equal to 60% of the size of the entire advertisement, may be classified into both the "tech" and "electronics" categories.

In a further embodiment, one or more objects may be determined to be common among various types of advertisements and/or among advertisements of varying success. An object may be common among various types of advertisements when, e.g., the object appears prominently in advertisements of two or more advertising categories. In such an embodiment, the common objects may be identified as stop-objects that do not provide a sufficient indication of the appropriate advertisement categories. In that embodiment, stop-objects are not recognized during classification. As an example, grass may appear in advertisements related to lawn care, but may also appear in advertisements related to other categories such as food, auto, athletic wear, and so on. Further, grass may appear in both successful and unsuccessful advertisements. Thus, grass may be identified as a stop-object common to various types of advertisements, and will not be recognized during classification.

In another embodiment, an advertisement category may have one or more advertisement sub-categories. Advertisement sub-categories may represent finer detail categorizations of advertisements based on lower level hierarchical visual characteristics discovered during machine learning. As a non-limiting example, "sweets" (e.g., fruits, candy, pastries, etc.) may be identified as an advertisement sub-category of "food." In a further embodiment, each sub-category may further have one or more sub-categories thereof. As a non-limiting example, "chocolates" may be identified as a sub-category of "sweets." Further sub-categorizations may be identified within each sub-category.

In S340, visual characteristics that are associated with successful advertisements within the classified category are identified via a deep learning network. An advertisement may be successful if, e.g., the advertisement is associated with a CTR or other performance metric that is above a predefined threshold. The successful advertisements may be retrieved from a database. In a typical embodiment, stop-objects, which are likely to be featured in both successful and unsuccessful advertisements, are not identified in S340.

A visual characteristic may be determined to be associated with successful advertisements where the visual characteristic appears prominently or frequently in the identified successful advertisements. In an embodiment, prominence of a visual characteristic may be determined based on whether the object is in the foreground and/or whether the size of the object is above a predetermined prominence threshold. In an embodiment, a visual characteristic appears frequently when it appears above a predetermined frequency threshold for appearance. The frequency threshold may be, but is not limited to, a number of instances, a percentage, and so on. As a non-limiting example, within the "electronics" category, a "television" object appearing in at least 40% successful advertisements may be identified as appearing frequently. As another non-limiting example, within the "food" category, a "green background" visual characteristic appearing in at least 2,000,000 successful advertisements may be identified as a visual characteristic which contributes to the success of the advertisement.

In S350, recommendations for designing the advertisement using the identified visual characteristics are generated. In an embodiment, the recommendations may be generated by the recommendation generator 240. The recommendations may include, but are not limited to, an addition or change of a visual characteristic (e.g., a background change, a brightness change, and so on), a replacement of a visual characteristic, a size of a visual characteristic to be inserted, and so on. The recommendations may be generated based on, e.g., the size of the advertisement in which the visual characteristic will be inserted, sizes of other visual characteristics existing in the advertisement, and so on. In an embodiment, a user may be prompted to either accept or reject the recommended change. In a further embodiment, the user may be allowed to modify the recommendation before accepting the recommended change. Modifications of recommendations may include, but are not limited to, changing the size of a recommended visual characteristic, selecting a different visual characteristic to be inserted, inserting additional copies of the recommended visual characteristic into the advertisement, changing one or more recommended visual characteristics, and so on.

As a non-limiting example, a designer creates two images for an advertisement for pizza delivery, one featuring an image of a cheese pizza and another featuring an image of a vegetable pizza. Prior analysis shows that successful advertisements showing vegetable objects are considered to be successful advertisements. Therefore, recommended visual characteristics may include vegetable objects in food category advertisements. That is, using these recommendations, the designer can select the vegetable pizza as an image to place in the pizza delivery ad.

Figure 4:
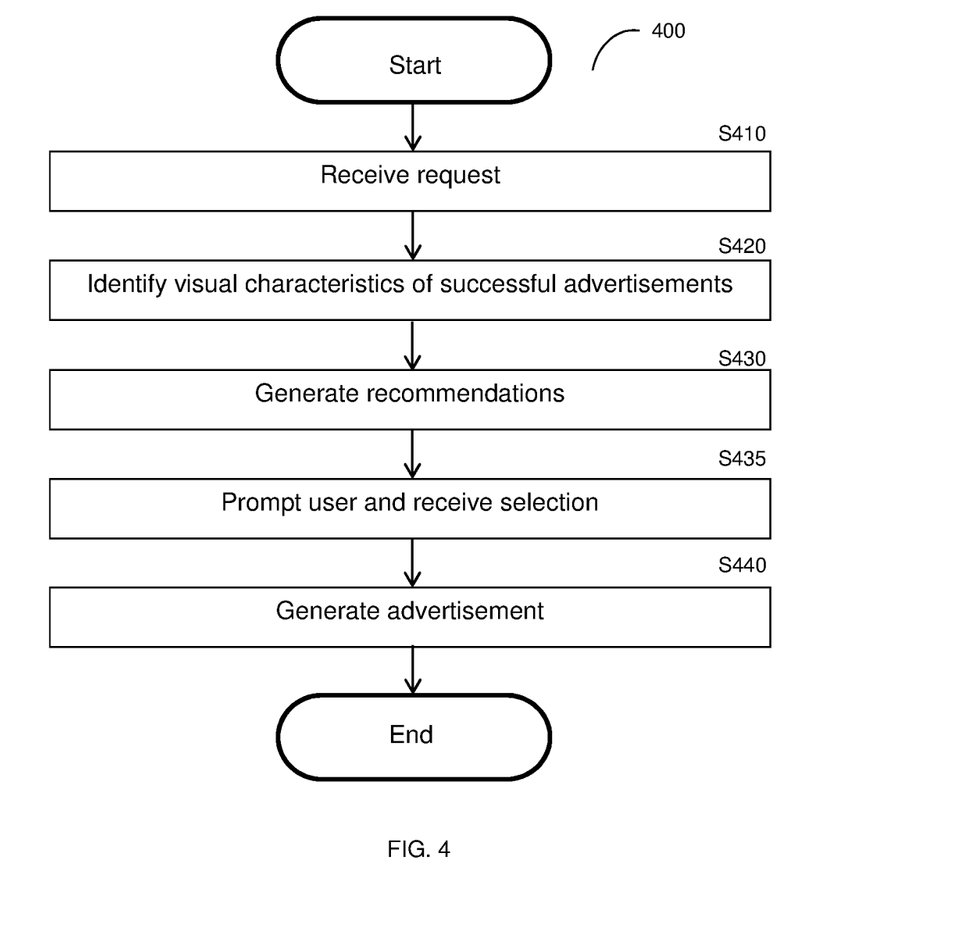
FIG. 4 is a flowchart illustrating a method for generating a successful image-based advertisement according to an embodiment.

FIG. 4 is an exemplary and non-limiting flowchart 400 illustrating a method for generating a successful image-based advertisement according to an embodiment. In an embodiment, the successful advertisement may be generated by an ad-improving system (e.g., the ad-improving system 140).

In S410, a request to generate a successful image-based advertisement is received. The request includes at least one category and/or sub-category for the advertisement. In an embodiment, the request may further include desired visual characteristics to be included in the generated advertisement. As a non-limiting example, an advertiser for a new brand of soda may wish to include an image of a bottle of the new soda and a slogan for the advertisement campaign in the generated advertisement. The request may also include required sizes, shapes, colors, and so on, of the desired visual characteristics.

In S420, visual characteristics that are associated with successful advertisements within the classified category are identified via a deep learning neural network. An advertisement may be successful if, e.g., the advertisement is associated with a CTR or other performance metric that is above a predefined threshold. The successful advertisements may be retrieved from a database. In a typical embodiment, stop-objects, which are likely to be featured in both successful and unsuccessful advertisements, are not identified.

A visual characteristic may be determined to be associated with successful advertisements where the visual characteristic appears prominently or frequently in the identified successful advertisements. In an embodiment, prominence of a visual characteristic may be determined based on whether the visual characteristic is in the foreground and whether the size of the visual characteristic is above a predetermined prominence threshold. In an embodiment, a visual characteristic appears frequently when it appears above a predetermined frequency threshold for appearance. The frequency threshold may be, but is not limited to, a number of instances, a percentage, and so on.

In S430, recommendations for visual characteristics to be inserted into the advertisement are generated. The recommendations may include, but are not limited to, visual characteristics, placements, orientations, and/or sizes to be included in the generated advertisement. The placements, orientations, and/or sizes may be defined relative to a size of the advertisement to be generated. Exemplary recommendations include, but are not limited to, adding a red background, placing a speedboat in a "tech" category advertisement, placing a red model of a car in an advertisement in the "auto" category, brightening an advertisement in the "toys" category, including an image of a large sandwich in an advertisement in the "food" category, and so on.

In optional S435, the recommendations may be sent to a user, who is prompted to select one or more of the recommendations. The selections by the user are received. The user may select any or all of the proposed recommendations to be implemented in the generated advertisement. In an embodiment, the user may counter with different visual characteristics in response to a proposed recommendation. For example, if a recommendation is to include an image of a coconut, the user may instead counter with a kiwi. In that case, the recommendation will be modified accordingly. The modified recommendation may be further sent to a user for selection and/or further countering. Modifying the recommendation may include, but is not limited to, making changes input by the user (e.g., changing a size, shape, color, object, and so on of the recommendation), and so on.

In S440, an advertisement is generated based on the recommendations and/or the selections. In an embodiment, the generation of the advertisement may be further based on the desired visual characteristics received with the request. In such an embodiment, the recommendations may be modified to accommodate the additional desired visual characteristics. In an embodiment, the advertisement may be generated according to predetermined parameters. Such parameters may include, but are not limited to, maximum size of objects relative to the advertisement, minimum required space between objects in the advertisement, default visual characteristics (e.g., a default background to be used in case no visual characteristic background is identified), and so on.

As a non-limiting example, a request to generate a "services" category advertisement within the "dog walking" sub-category is received. The request includes a slogan for the service as a desired visual characteristic. The request specifies that the height of the slogan should be 25% of the height of the advertisement, that the width of the slogan should be 75% of the width of the advertisement, and that the letters of the slogan should be in green. Based on machine learning with respect to successful advertisements in the "dog walking" sub-category, a blue background and dog objects are identified as being associated with successful "dog walking" advertisements. Respective of the identifications, recommendations to include two images of dogs and a blue background in the advertisement are generated. The advertiser is prompted to confirm the recommendations. Upon confirmation of the recommendations, the advertisement is generated. The generated advertisement features two dogs picture above the slogan, with a blue background. The slogan in the generated advertisement meets the required relative height (25%), relative width (75%), and color (green).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method using a computer system for improving online advertising success for an image-based advertisement, comprising:
   receiving, at the computer system, an advertisement transmitted from an advertisement-serving system;
   identifying, by the computer system, at least one visual characteristic of the advertisement by analyzing the advertisement using one or more machine learning algorithms to identify at least one of an object, a color, or a background of the advertisement;

classifying, by the computer system, the advertisement into at least one advertisement category based on the identified at least one visual characteristic;

analyzing, by the computer system using a deep learning neural network, a plurality of advertisements stored in a storage that is accessible to the computer system and which belong to the at least one advertising category to identify at least one visual characteristic associated with successful online advertisements, wherein an online advertisement is considered to be successful when the online advertisement meets a prescribed performance criteria, wherein the prescribed performance criteria comprises at least one of a click-through-rate, an impression count, or a number of clicks;

generating, by the computer system, at least one recommendation for improving the image-based advertisement based on the identified at least one successful advertisement visual characteristic;

causing, by the computer system, the advertisement-serving system to serve the image-based advertisement when it is determined that the image-based advertisement includes the at least one successful advertisement visual characteristic; and causing, by the computer system, the advertisement-serving system to request a different image-based advertisement when it is determined that the image-based advertisement does not include the at least one successful advertisement visual characteristic.

2. The method of claim 1, wherein the at least one visual characteristic includes at least one object, wherein the classification is based on a prominence of the at least one object.

3. The method of claim 2, wherein the analysis further comprises:
determining, for each object, whether the object is common to at least two advertising categories; and
identifying each object that is common to at least two advertising categories as a stop-object, wherein the classification is not based on the stop-objects.

4. The method of claim 1, wherein the at least one recommendation includes any of: adding a visual characteristic, changing a visual characteristic, replacing a visual characteristic, and a size of a visual characteristic to be inserted.

5. The method of claim 1, further comprising:
prompting a user to accept or reject the at least one recommendation.

6. The method of claim 5, further comprising:
receiving, from the user, a modification to the at least one recommendation; and
modifying the at least one recommendation based on the modification.

7. The method of claim 1, further comprising:
retrieving the image-based advertisement from a database.

8. A method comprising:
receiving, at a computer system, an advertisement;
identifying, by the computer system, at least one visual characteristic of the advertisement by analyzing the advertisement using one or more machine learning algorithms to identify at least one of an object, a color, or a background of the advertisement;
classifying, by the computer system, the advertisement into at least one advertisement category based on the identified at least one visual characteristic;
analyzing, by the computer system using a deep learning neural network, a plurality of advertisements stored in a storage that is accessible to the computer system and which belong to the at least one advertising category to identify at least one visual characteristic associated with successful online advertisements, wherein an online advertisement is considered to be successful when the online advertisement meets a prescribed performance criteria, wherein the prescribed performance criteria comprises at least one of a click-through-rate, an impression count, or a number of clicks;
generating, by the computer system, at least one recommendation for improving the image-based advertisement based on the identified at least one successful advertisement visual characteristic;
modifying the image-based advertisement so as to implement the at least one recommendation; and
transmitting the modified image-based advertisement over a computer network for display on a web page on a user device.

9. A computer system for improving online advertising success for an image-based advertisement, comprising:
a processing unit; and
a memory, the memory containing instructions that, when executed by the processing unit, configure the system to:
receive, at the computer system, an advertisement transmitted from an advertisement-serving system;
identify, by the computer system, at least one visual characteristic of the advertisement by analyzing the advertisement using one or more machine learning algorithms to identify at least one of an object, a color, or a background of the advertisement;
classify, by the computer system, the advertisement into at least one advertisement category based on the identified at least one visual characteristic;
analyze, by the computer system using a deep learning neural network, a plurality of advertisements stored in a storage that is accessible to the computer system and which belong to the at least one advertising category to identify at least one visual characteristic associated with successful online advertisements, wherein an online advertisement is considered to be successful when the online advertisement meets a prescribed performance criteria, wherein the prescribed performance criteria comprises at least one of a click-through-rate, an impression count, or a number of clicks;
generate, by the computer system, at least one recommendation for improving the image-based advertisement based on the identified at least one successful advertisement visual characteristic;
cause, by the computer system, the advertisement-serving system to serve the image-based advertisement when it is determined that the image-based advertisement includes the at least one successful advertisement visual characteristic; and
cause, by the computer system, the advertisement-serving system to request a different image-based advertisement when it is determined that the image-based advertisement does not include the at least one successful advertisement visual characteristic.

10. The computer system of claim 9, wherein the at least one visual characteristic includes at least one object, wherein the classification is based on a prominence of the at least one object.

11. The computer system of claim 9, wherein the system is further configured to:
   determine, for each object, whether the object is common to at least two types of advertisements; and
   identify each object that is common to at least two types of advertisements as a stop-object, wherein the classification is not based on the stop-objects.

12. The computer system of claim 9, wherein the at least one recommendation includes any of: adding a visual characteristic, changing a visual characteristic, replacing a visual characteristic, and a size of a visual characteristic to be inserted.

13. The computer system of claim 9, wherein the system is further configured to:
   prompt a user to accept or reject the at least one recommendation.

14. The computer system of claim 13, wherein the system is further configured to:
   receive, from the user, a modification to the at least one recommendation; and
   modify the at least one recommendation based on the modification.

15. The computer system of claim 9, wherein the system is further configured to:
   retrieve the image-based advertisement from a database.

16. The method of claim 1, further comprising:
   selecting, based on the at least one recommendation, an advertisement from a predefined set of advertisements.

\* \* \* \* \*